United States Patent

Jones et al.

[15] 3,668,172

[45] June 6, 1972

[54] PIGMENTED POLYESTER COMPOSITIONS

[72] Inventors: George F. Jones; John R. Mendel, both of Glens Falls, N.Y.

[73] Assignee: Hercules Incorporated, Wilmington, Del.

[22] Filed: Nov. 25, 1969

[21] Appl. No.: 879,924

[52] U.S. Cl. ................. 260/32.6 R, 260/30.6 R, 260/40 R, 260/873
[51] Int. Cl. ............... C08g 51/44, C08g 51/50, C08g 51/02
[58] Field of Search .......................... 260/30.6, 40, 32.6, 873

[56] References Cited

UNITED STATES PATENTS

| | | | |
|---|---|---|---|
| 3,317,633 | 5/1967 | Tesoro et al. | 260/873 |
| 3,360,497 | 12/1967 | Jones et al. | 260/41 |
| 3,361,705 | 1/1968 | Kay et al. | 260/40 |

*Primary Examiner*—Morris Liebman
*Assistant Examiner*—Samuel L. Fox
*Attorney*—Charles L. Board

[57] ABSTRACT

Uniformly pigmented polyester compositions which can be melt spun into fine denier multifilament fibers are described. The preferred compositions are homogeneous blends of unpigmented polyester and a polyethylene pigment concentrate composed of pigment highly dispersed in a mixture of low molecular weight polyethylene, high molecular weight, medium density polyethylene and a surfactant. The most preferred blends also contain a small amount of a phosphoric acid ester.

6 Claims, No Drawings

PIGMENTED POLYESTER COMPOSITIONS

This invention relates to pigmented polyester compositions and to the production of multifilament fibers therefrom.

The conventional coloring of polyester multifilament fibers has normally been accomplished by embedding disperse dyestuff molecules into the fiber. It is necessary to use those dyestuffs which do not sublime and have good penetration. Precise time and temperature controls are also required to avoid shade variations and/or a reduction in the finished fiber properties. Moreover, expensive carriers are necessary for proper dye penetration into the fiber, and the carrier must be removed, at least in part, to prevent reduced lightfastness and subsequent odor formation. Thus any dispersion advantages are more than offset by processing difficulties which are both lengthy and costly.

An alternate method to the dying procedure has been the addition of pigments to the monomer during the polymerization stage. The resulting polyester pigment dispersions are not sufficiently complete to provide trouble-free melt spinning into fiber. Such fibers, moreover, are inferior in that they cannot be drawn successfully into fine deniers, have low tenacities, and possess poor color depth.

Another method which has been proposed for pigmenting polyester resins comprises blending small grains of the polyester resin with powdered pigment in the presence of a small amount of molten paraffin wax. The pigmented resins produced in this manner are likewise not homogeneous and are inferior. Moreover, in order to extrude the resins into fiber, a very strict control on the moisture content of the polymer must be maintained to prevent polymer degradation and loss of desirable properties.

It is also known from U.S. Pat. No. 3,360,497 that pigment concentrates essentially free of pigment aggregates can be produced from a co-melted mixture of oil wetting agent, low molecular weight polyolefin and high molecular weight polyolefin, and that these concentrates can be mixed with unpigmented polyolefin to give compositions which perform satisfactorily during melt spinning of the polyolefin into fibers and subsequent drawing. Such concentrates, however, are designed for use with polyolefins and their use for pigmenting polymers other than polyolefins is not disclosed. Moreover, attempts to prepare a satisfactory pigmented polyester composition for use in making fibers by blending with the polyester a pigment concentrate utilizing a polyester as the base resin have been unsuccessful because of extrusion difficulties, extensive doglegging (tendency of material to leave the spinning jet sideways thus causing entanglement of filaments in the spinning chimney), and excessive degradation of the polyester.

Now in accordance with the present invention it has been found that certain pigments concentrates can be blended with polyester resins to give uniformly pigmented polyester compositions of such improved homogeneity that they can be melt spun readily into fine denier multifilament or monofilament fibers. Moreover, doglegging is completely eliminated and lower spinning temperatures can be used thereby avoiding undue degradation of the polyester resin. Additionally, and most unexpectedly, it has been found that not only can the pigmented compositions be spun easily but that they can be spun as easily as can natural or about polyester resin, and that the pigmented fibers thus have as good as or better properties than the unpigmented fibers.

Accordingly, the present invention relates to a uniformly pigmented polyester composition comprising a blend of unpigmented polyester and a polyolefin pigment concentrate composed of pigment highly dispersed in a mixture of low molecular weight polyolefin having a molecular weight from about 1,000 to about 10,000 and preferably from about 1,000 to about 3,000 a high molecular weight polyolefin having a molecular weight of above about 20,000, and preferably from about 25,000 to abut 75,000 and a heat stable surfactant soluble or dispersible in the low molecular weight polyolefin and capable of wetting out the pigment in the polyolefin, to a process for producing multifilament fibers therefrom, and to the fibers so produced.

The polyester resins which can be pigmented in accordance with this invention are the thermoplastic linear condensation polyesters which are homopolyesters, copolyesters or terpolyesters comprising a series of predominantly carbon atom chains joined by recurring carbonyloxy radicals

Included, for example, are the polyesters disclosed in U.S. Pat. Nos. 2,465,319; 2,901,466; and 3,018,272. Particularly preferred are the polyesters having an intrinsic viscosity of at least about 0.3 and preferably at least about 0.4 prepared from dicarboxylic acids or ester-forming derivatives thereof and glycols, for example poly(ethylene terephthalate), poly(propylene terephthalate), poly(tetramethylene terephthalate), poly(2,2-dimethyl-1,3-propylene terephthalate), poly(cyclohexane-dimethanol terephthalate), poly(ethylene bibenzoate), and copolyesters of terephthalic acids with an aromatic dicarboxylic acid such as ethylene terephthalate - ethylene isophthalate copolyesters and copolyesters of an aromatic dicarboxylic acid such as terephthalic acid with one or more aliphatic dicarboxylic acids such as adipic acid, sebacic acid or azelaic acid. Typical aromatic dicarboxylic acids include phthalic acid, isophthalic acid and terephthalic acid and typical glycols include ethylene glycol, propylene glycol, hexamethylene glycol, 1,4-cyclohexane dimethanol and the like.

The polyolefin pigment concentrates which are used in the present invention are produced by first preparing an aqueous dispersion of the pigment in the presence of a suitable water-soluble or water-dispersible cationic or anionic surfactant, transferring the pigment in this form to a low molecular weight polyolefin dissolved in a solvent, adding sufficient of the high molecular weight polyolefin in powdered form, either prior to such transfer or subsequent thereto, to bring the pigment content to a desired level, removing water and solvent and then drying in conventional manner, and subjecting the dried product to high shear, as by passage through an extruder with a compounding screw or working on a two-roll mill. A detailed discussion of the pigment concentrates and their preparation is given in U.S. Pat. No. 3,360,497. Preferred pigment concentrates are those which contain polyethylene as the polyolefin, low density polyethylene being the most preferred low molecular weight polyolefin and medium density polyethylene being the most preferred high molecular weight polyolefin. The concentrate will generally contain from about 20 to about 85 percent pigment when an inorganic pigment is used and from about 15 to about 50 percent pigment when an organic pigment is used, and the low molecular weight polyolefin will usually be present in the concentrate in an amount sufficient to give a low molecular weight polyolefin:pigment ratio of from about 0.8:1 to about 1.2:1 for organic pigment and from about 0.1:1 to about 0.5:1 for inorganic pigment. The amount of high molecular weight polyolefin in the concentrate will usually vary from about 2 to about 4 times the amount of low molecular weight polyolefin. The surfactant will generally be present in small amounts and usually in an amount varying from about 3 to about 35 percent by weight of the pigment, depending of course upon the ultimate particle size of the pigment.

The blending of the polyester with the pigment concentrate can be carried out in any convenient manner for intimately mixing two thermoplastic materials. A particularly convenient method is to add the polyester and concentrate to an extruder with a suitable mixing screw. Similar results can be obtained by mixing molten streams of the polyester and concentrate by means of a metering pump and then extruding the mixture through a suitable die.

The amount of pigment concentrate blended with the polyester will vary depending on the amount and type of pigment in the concentrate and the shade and color intensity desired. In general, the amount of pigment concentrate will be sufficient to provide in the final polyester composition from about 0.1 to about 4 percent of organic pigment and from about 0.1 to about 5 percent of inorganic pigment.

Other ingredients such as heat and light stabilizers, antioxidants, antistatic agents, viscosity improvers, mold release agents, flame retardants, fillers, extenders and the like can also be present in the pigmented compositions of the invention in amounts which do not detract from the advantages of the invention. Such ingredients can be incorporated as an additive during the preparation of the concentrate or later, as in the blending step of the concentrate and polyester. Usually, the amount of such additives will not exceed about 1 or 2 percent by weight of the total composition.

The addition of a small amount of certain additives of the phosphorus type has been found to provide unexpected improvements both in spinning and in properties of the fibers, apparently due to some synergistic effect. Thus, by the use of a small amount, as for example up to about 1 percent by weight of an organic ester of phosphoric acid higher tenacities and finer deniers can be realized at increased draw ratios with fewer breaks per filament. The preferred compositions of the invention will contain from about 0.05 to about 0.5 percent by weight of an alkyl or aryl phosphate such as for example tributyl phosphate, tritolyl phosphate, triphenyl phosphate, and the like. Triphenyl phosphate is particularly preferred.

The pigmented polyester compositions of the invention can be fabricated into any desired article such as film, tape, ribbon, fiber, etc. The compositions are particularly useful for fiber and can be spun into monofilament or multifilament under the range of conditions normally employed for the spinning of unpigmented polyester fiber, as for example at from about 240° to about 315° C. and preferably at about 275° to about 295° C. Fibers produced from the compositions of the invention will preferably contain by weight of the fiber from about 0.1 to about 3 percent of pigment, from about 0.02 to about 3 percent of low molecular weight polyolefin having a molecular weight from about 1,000 to about 10,000, from about 0.1 to about 6 percent of high molecular weight polyolefin having a molecular weight above about 20,000 and from about 0.001 to about 1 percent of a heat stable surfactant soluble or dispersible in the low molecular weight polyolefin and capable of wetting out the pigment in the polyolefin.

Having described the invention generally, the following examples are given to illustrate specific embodiments thereof. All percentages are by weight unless otherwise indicated.

EXAMPLE 1

Eighty pounds of carbon black dry color were charged into a pebble mill with 20 pounds of a mixed alkyl diethyleneoxide amine acetate having an average molecular weight of 285 and a mixed alkyl group containing 12 to 18 carbon atoms (added as a 25 percent solution) and 160 pounds of water. This mixture was ground for 40 hours and dumped. The product was a fluid aqueous dispersion of carbon black whose particles were colloidal in character (about 0.2 micron or less in size).

An agitated stainless steel flushing tank was charged with 120 Imperial gallons of water, 120 pounds of mineral spirits and 80 pounds of low molecular weight polyethylene having a molecular weight of approximately 2500 and a density of 0.910. This mixture was heated to 60°C. under agitation. The above pigmented dispersion and pounds of powdered polyethylene having a molecular weight of about 28,000 and a density of 0.924 were then added and the whole was stirred to a homogeneous mixture while heating to 88° C. Two pounds of 50 percent sodium hydroxide was then added. After a short stir the batch was checked for color transfer from the aqueous phase to the nonaqueous phase. The aqueous phase should be completely free of color at this point and the pH value should be approximately 9.5. The pigmented phase should be in the form of small granules. The batch was next heated to and maintained at 96° C. until the solvent was removed, after which additional water was added to reduce the temperature to 60° C. The batch was then run out onto a screen where the bulk of the water was removed. The partly dewatered material was thoroughly washed with water and then dried to produce 320 pounds of pigmented material containing 25 percent dry carbon black.

This material was extruded through a vented extruder fitted with a compounding screw and a strand die. The strands were pelletized and then ground to give a powdered pigment concentrate.

80 pounds of the above concentrate were melt blended with 1920 pounds of poly(ethylene terephthalate) having a molecular weight of approximately 20,000 (an intrinsic viscosity of 0.65 in a 60:40 by weight mixture of phenol and tetrachloroethane) using a single stage, screw type extruder. The blend was spun at 293° C. into continuous 12 denier filaments at the rate of 600 meters per minute using a multifilament die. The resulting filaments were then drawn at a draw ratio of 4:1. Spinning performance was excellent. The fibers so produced were uniformly colored, had a high jet black luster and had a denier per filament of 2.6 and a tenacity of 4 grams per denier. The microscopic quality was good and the maximum particle size of the pigment in the fiber did not exceed 10 microns for less than 3 denier fiber. Fibers produced in the same manner from poly(ethylene terephthalate) which was not blended with the pigment concentrate gave clear fibers having a denier per filament of 2.9 and a tenacity of 4 grams per denier. Spinning performance data on the pigmented polyester composition and unpigmented polyester showed that the former was about 80 percent as efficient.

EXAMPLE 2

The procedure of Example 1 was repeated except that the pebble mill was charged with 50 pounds of cadmium yellow, 10 pounds of the amine acetate and 50 pounds of water, the flushing tank was charged with 120 Imperial gallons of water, 10 pounds of mineral spirits and 10 pounds of the low molecular weight polyethylene, and 40 pounds of the high molecular weight polyethylene were used.

The fibers of this example were of good quality and had characteristics similar to those of Example 1.

EXAMPLE 3

The procedure of Example 1 was repeated except that the pebble mill was charged with 320 pounds of phthalocyanine blue presscake (80 pounds, dry weight), 16 pounds of 1-(2-hydroxyethyl)-2-n-heptadecenyl-2-imidazoline acetate and 100 pounds of water, the flushing tank was charged with 120 Imperial gallons of water, 100 pounds of mineral spirits and 80 pounds of the low molecular weight polyethylene, and 160 pounds of the high molecular weight polyethylene were used. The fibers of this example were of good quality and had a denier per filament of 2.4 and a tenacity of 3.3 grams/denier.

EXAMPLE 4

The procedure of Example 1 was repeated except that the pebble mill was charged with 250 pounds of titanium dioxide white pigment, 10 pounds of the amine acetate and 110 pounds of water, the pebble mill charge was ground for 20 hours, the flushing tank was charged with 120 Imperial gallons of water, 100 pounds of mineral spirits and 50 pounds of the low molecular polyethylene and 200 pounds of the powdered polyethylene were used. The fibers of this example were of good quality and had characteristics similar to those of Example 1.

EXAMPLE 5

The procedure of Example 1 was repeated except that 80 pounds of the concentrate of Example 1 was blended with 1,918 pounds of the poly(ethylene terephthalate) and 2 pounds of triphenyl phosphate. The fibers of this example were jet black and had a denier per filament of 1.5 and a tenacity of 5 grams per denier. Fibers prepared from a composition containing 80 pounds of the concentrate and 1920 pounds of the poly(ethylene terephthalate) but no triphenyl phosphate had a denier per filament of 2.6 and a tenacity of 2.7 grams per denier.

As can be seen by the above examples the pigmented polyester compositions of the invention are characterized by being uniform, homogeneous blends which are free of aggregates and can be melt spun readily into uniformly colored fibers. Additionally, the fibers can be stretched without breakage to filaments of fine denier, e.g., less than 3.0 denier with excellent tenacities.

What we claim and desire to protect by Letters Patent is:

1. A uniformly pigmented polyester composition comprising a homogeneous blend of an unpigmented, thermoplastic, linear condensation polyester and sufficient of a polyolefin pigment concentrate to provide to the composition from 0.1 to 4 wt. % of an organic pigment or from 0.1 to 5 wt. % of an inorganic pigment, said concentrate being composed of pigment highly dispersed in a mixture of low molecular weight polyolefin having a molecular weight from about 1,000 to about 10,000, high molecular weight polyolefin having a molecular weight above about 20,000 and a heat stable surfactant soluble or dispersible in the low molecular weight polyolefin and capable of wetting out the pigment in the polyolefin, the ratio of high molecular weight polyolefin to low molecular weight polyolefin being 2:1 to 4:1 and the ratio of low molecular weight polyolefin to pigment being 0.8:1 to 1.2:1 when the pigment is an organic pigment and 0.1:1 to 0.5:1 when the pigment is an inorganic pigment.

2. The composition of claim 1 wherein the low molecular weight and high molecular weight polyolefins are polyethylene.

3. The composition of claim 2 wherein the high molecular weight polyethylene is medium density polyethylene.

4. A process for producing a uniformly pigmented polyester fiber which comprises blending an unpigmented, thermoplastic, linear condensation polyester and sufficient of a polyolefin pigment concentrate to provide from 0.1 to 4 percent of an organic pigment or from 0.1 to 5 percent of an inorganic pigment based on the weight of the blend and then melt spinning the blend into fiber, said concentrate being composed of pigment highly dispersed in a mixture of low molecular weight polyolefin having a molecular weight from about 1,000 to about 10,000, high molecular weight polyolefin having a molecular weight above about 20,000 and a heat stable surfactant soluble or dispersible in the low molecular weight polyolefin and capable of wetting out the pigment in the polyolefin, the ratio of high molecular weight polyolefin to low molecular weight polyolefin being 2:1 to 4:1 and the ratio of low molecular weight polyolefin to pigment being 0.8:1 to 1.2:1 when the pigment is an organic pigment and 0.1:1 to 0.5:1 when the pigment is an inorganic pigment.

5. A polyester fiber containing by weight of the fiber from about 0.1 to about 3 percent of pigment, from 0.02 to about 3 percent of low molecular weight polyolefin having a molecular weight from about 1,000 to about 10,000, from about 0.1 to about 6 percent of high molecular weight polyolefin having a molecular weight above about 20,000 and from about 0.001 to about 1 percent of a heat stable surfactant soluble or dispersible in the low molecular weight polyolefin and capable of wetting out the pigment in the polyolefin.

6. The fiber of claim 5 wherein the surfactant is a mixed alkyl diethyleneoxide amine acetate having a mixed alkyl group containing 12 to 18 carbon atoms.

* * * * *